United States Patent Office 2,876,230
Patented Mar. 3, 1959

2,876,230
1-HALOMERCURI, TRIHALO BENZIMIDAZOLES

Karl A. Folkers, Plainfield, and Clifford H. Shunk, Westfield, N. J., assignors to Merck & Co., Inc., Rahway, N. J., a corporation of New Jersey No Drawing. Original application November 23, 1956, Serial No. 623,766. Divided and this application August 26, 1957, Serial No. 680,418

8 Claims. (Cl. 260—299)

This application is a continuation-in-part of our copending application Serial No. 422,662, filed April 12, 1954, now abandoned, and a division of our copending application, Serial No. 623,766, filed November 23, 1956.

This invention relates to the preparation of the new chemical compounds, 4,5,6-(5,6,7)-trihalo-1-D-ribofuranosylbenzimidazole, to acid salts, and to water soluble esters thereof. It is also concerned with preparation of the novel chemical compounds produced as intermediates in the synthesis of 4,5,6-(5,6,7)-trihalo-1-D-ribofuranosylbenzimidazole.

Certain compounds of this invention possess marked and effective anti-viral activity against influenza B virus. For example, 4,5,6-(5,6,7)-trichloro-1-D-ribofuranosylbenzimidazole has seven hundred to eight hundred times the inhibitory action of benzimidazole against influenza B virus when tested in accordance with the method later described. A number of substituted benzimidazoles outside the scope of this invention have also been tested for activity against influenza B virus and have been found to have little inhibitory activity.

The compositions of this invention are prepared by reducing 1,2,3-trihalo-4,5-dinitrobenzene to form 1,2,3-trihalo-4,5-diaminobenzene having the following formula:

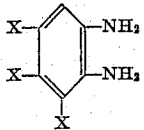

wherein X represents a halogen atom. The halogen atoms may be the same or different.

The 1,2,3-trihalo-4,5-diaminobenzene thus formed is then reacted with formic acid and a mineral acid to form 4,5,6-trihalo-benzimidazole having the following formula:

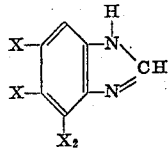

wherein X represents a halogen atom, which is in turn treated with a mercuric halide to produce the new 1-halomercuri-4,5,6-(5,6,7)-trihalobenzimidazole, having the following formula:

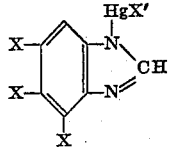

wherein X and X' represent halogen atoms and X and X' need not be the same halogen atoms.

The 1-halomercuri-4,5,6-(5,6,7)-trihalobenzimidazole is next reacted with a 1-halo-2,3,5-triacyl-D-ribofuranose having the formula

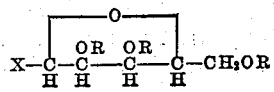

wherein X represents a chlorine or bromine atom and R represents an acyl radical. The new compound formed in this reaction is 4,5,6-(5,6,7)-trihalo-1-(triacyl-D-ribofuranosyl)-benzimidazole, and has the formula

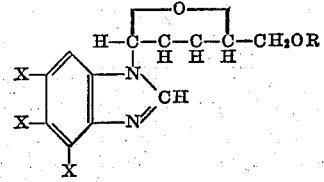

The 4,5,6-(5,6,7)-trihalo-1-(triacyl-D-ribofuranosyl)-benzimidazole is hydrolyzed to form the 4,5,6-(5,6,7)-trihalo-1-D-ribofuranosylbenzimidazole, which is a new compound and has the formula

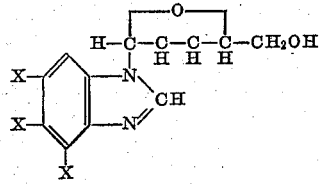

The 4,5,6 - (5,6,7) - trihalo - 1 - D - ribofuranosylbenzimidazole acid salts are prepared by reacting 4,5,6-(5,6,7)-trihalo-1-D-ribofuranosylbenzimidazole with an acid in aqueous or alcoholic solution. The salt may be isolated by removal of solvent under reduced pressure. Acid salts, such as the 4,5,6-(5,6,7)-trihalo-1-D-ribofuranosylbenzimidazole hydrochloride, 4,5,6-(5,6,7)-trihalo - 1 - D - ribofuranosylbenzimidazole hydrobromide, 4,5,6 - (5,6,7) - trihalo - 1 - D - ribofuranosylbenzimidazole sulfate, 4,5,6 - (5,6,7) - trihalo - 1 - D - ribofuranosylbenzimidazole citrate and 4,5,6-(5,6,7)-trihalo-1-D-ribofuranosylbenzimidazole acetate, may be prepared in this manner.

In addition to the acid salts, water soluble esters such as the phosphate and tricarballylate of these novel 4,5,6-(5,6,7) - trihalo - 1 - D - ribofuranosylbenzimidazoles may be prepared by reacting the parent compound with a suitable esterifying agent. Pyrophosphoric acid or phosphorous oxychloride pretreated with one molar equivalent of water are suitable phosphorolating agents. It is believed that the phosphate ester forms primarily at the 5' position although 2' and 3' esters may also be present.

1,2,3-trichloro-4,5-dinitrobenzene, one of the starting materials in this invention, may be prepared as described by Huffer, Rec. Trav. Chim. 40, 451.

The 1-halo-2,3,5-triacyl-D-ribofuranose employed as an intermediate in this process may be prepared by reacting tetraacyl-D-ribofuranose with a halogen halide.

In accordance with the process of this invention 1,2,3-trichloro-4,5-dinitrobenzene is suspended in concentrated hydrochloric acid. Mossy tin is added to the suspension and 1,2,3-trichloro-4,5-diaminobenzene produced by heating at from 50–100° C. for from 15 minutes to 2 hours.

The 1,2,3-trichloro-4,5-diaminobenzene is reacted with formic acid and hydrochloric acid to form 4,5,6-trichlorobenzimidazole. The free base is recovered by neutralization of the mineral acid with a base and crystallization.

The 4,5,6-trichlorobenzimidazole is next reacted with mercuric chloride in an inert solvent in the presence of an alkali metal base or alkaline earth metal base to form 1-chloromercuri-4,5,6-trichlorobenzimidazole. It has been found that the time and temperature of the reaction are not critical, although elevated temperatures accelerate the reaction. Any inert liquid medium in which the reactants are soluble but the reaction product is insoluble may be utilized as a medium in the reaction of 4,5,6-trichlorobenzimidazole and mercuric chloride. Water or lower alkanols, for example, ethanol, propanol, butanol and amyl alcohol, may be used. Suitable alkali metal bases or alkaline earth metal bases which may be employed in the process include sodium hydroxide, potassium hydroxide, calcium hydroxide, sodium carbonate, potassium bicarbonate, and the like. It is preferred to use about one equivalent of base to bind the free acid liberated in the reaction.

The 1-chloromercuri-4,5,6-(5,6,7)-trichlorobenzimidazole is then reacted with 1-halo-2,3,5-triacyl-D-ribofuranose in the presence of a solvent, and 4,5,6-(5,6,7)-trichloro-1-(triacyl-D-ribofuranosyl)-benzimidazole recovered. Compounds such as 1-chloro-2,3,5-triacetyl-D-ribofuranose, 1-bromo-2,3,5-triacetyl-D-ribofuranose, 1-chloro-2,3,5-tripropionyl-D-ribofuranose, 1-chloro-2,3,5-tributyryl-D-ribofuranose, 1-bromo-2,3,5-tribenzoyl-D-ribofuranose or 1-chloro-2,3,5-tribenzoyl-D-ribofuranose may be employed. Examples of suitable solvents for the reaction are benzene, toluene and xylene. Xylene is the preferred solvent for the reaction since the reflux temperature of xylene provides a convenient reaction temperature.

To produce the 4,5,6-(5,6,7)-trichloro-1-D-ribofuranosylbenzimidazole, the 4,5,6-(5,6,7)-trichloro-1-(triacyl-D-ribofuranosyl)-benzimidazole is hydrolyzed. The hydrolysis may be carried out in either an alkaline or acid medium. In accordance with the preferred procedure, 4,5,6-(5,6,7)-trichloro-1-(triacyl-D-ribofuranosyl)-benzimidazole is hydrolyzed with methyl alcohol in the presence of anhydrous ammonia. Anhydrous conditions are preferred for this reaction. Ammonia is also preferred since it is readily removed from the reaction mixture. Lower alkanols, such as methanol, ethanol, propanol and isopropanol, may be employed as solvents. If desired, acid hydrolysis may be conducted employing aqueous alcoholic solutions containing a hydrohalic acid.

The 4,5,6-(5,6,7)-trichloro-1-D-ribofuranosylbenzimidazole acid salts are prepared by reacting 4,5,6-(5,6,7)-trichloro-1-D-ribofuranosylbenzimidazole with an acid in aqueous or alcoholic solution. The salt may be isolated by removal of solvent under reduced pressure.

4,5,6-(5,6,7)-trichloro-1-D-ribofuranosylbenzimidazole and closely related compounds were tested for antiviral activity against influenza B virus as follows:

Groups of six chorio-allantoic membranes, the membrane from an embryonated egg which serves as a source of living cells, were quartered and each quarter placed in a separate tube containing 0.9 ml. of a nutrient fluid comprising saline, glucose and salts. Each of these tubes was inoculated with Lee influenza B virus diluted ten thousand times in a similar nutrient fluid, 0.1 ml. of the virus solution per tube. To each group of six inoculated tubes was added one of the compounds listed in Table I below. After thirty-six hours, hemagglutination titrations were carried out on the individual samples using a 0.25% concentration of chicken erythrocytes in solution. The geometric mean titer of each group was then computed.

The concentration of each benzimidazole derivative necessary to give 75% inhibition of viral multiplication was determined. The comparative activity of benzimidazole derivatives is given below.

The number of the position of the substituents in each of the compounds as given in the table is indicated in the following formula:

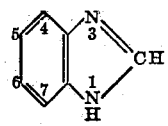

TABLE I

| | Inhibition rate |
|---|---|
| 5-methylbenzimidazole | 1.9 |
| 5,6-dimethylbenzimidazole | 1.9 |
| 2,5-dimethylbenzimidazole | 2.6 |
| 2-propyl-5-methylbenzimidazole | 14.3 |
| 2-ethyl-5-methylbenzimidazole | 19.2 |
| 2,4,5,6,7-pentamethylbenzimidazole | 16.3 |
| 2-isopropyl-5-methylbenzimidazole | 20.6 |
| 5,6-dichloro-1-D-ribopyranosylbenzimidazole | 15.2 |
| 5,6-dichloro-2-methyl-1-D-ribofuranosylbenzimidazole | 15.0 |
| 4,5,6-(5,6,7)-trichloro-1-D-ribofuranosylbenzimidazole | 700–800 |

The following examples are given by way of illustration and not of limitation.

*Example 1*

PREPARATION OF 1,2,3-TRICHLORO-4,5-DIAMINOBENZENE

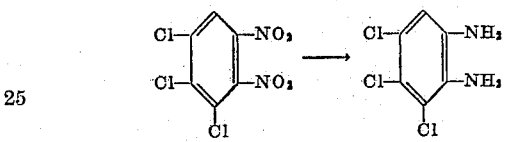

Ten grams (0.037 mole) of 1,2,3-trichloro-4,5-dinitrobenzene was suspended in 120 ml. of concentrated hydrochloric acid and heated on a steam bath. Mossy tin (15 g.) was added in small pieces with frequent shaking. Some concentrated hydrochloric acid was added from time to time to rinse down the condenser. After all the tin was added, the mixture was heated on a steam bath for one-half hour with frequent shaking. The reaction mixture was diluted with about 1400 ml. of water and heated until solution was almost complete. To the mixture was added activated charcoal and the mixture filtered. The filtrate was cooled, whereupon a colorless precipitate formed. With cooling the mixture was made strongly alkaline using 30% sodium hydroxide solution. The colorless precipitate, 1,2,3-trichloro-4,5-diaminobenzene which formed was collected on a funnel and washed well with water. The precipitate was dissolved in about 300 ml. of ether, dried over anhydrous magnesium sulfate and concentrated under reduced pressure. There was obtained 6.0 g. of 1,2,3-trichloro-4,5-diaminobenzene, M. P. 110–112° C.

In a similar manner other halogen atoms can be substituted for 1,2,3-trichloro-4,5-dinitrobenzene as the starting material in the above procedure. For example 1,2,3-tribromo-4,5-dinitrobenzene, 1,2-dichloro-3-bromo-4,5-dinitrobenzene, 1,2-dibromo-3-chloro-4,5-dinitrobenzene, 1,3-dichloro-2-bromo-4,5-dinitrobenzene, 1,2,3-tri-iodo-4,5-dinitrobenzene, or 1,2-dichloro-3-iodo-4,5-dinitrobenzene may be employed in this procedure to form the corresponding 1,2,3-tribromo-4,5-diaminobenzene, 1,2-dichloro-3-bromo-4,5-diaminobenzene, 1,2-dibromo-3-chloro-4,5-diaminobenzene, 1,3-dichloro-2-bromo-4,5-diaminobenzene, 1,2,3-triiodo-4,5-diaminobenzene, and 1,2-dichloro-3-iodo-4,5-diaminobenzene.

PREPARATION OF 4,5,6-TRICHLOROBENZIMIDAZOLE

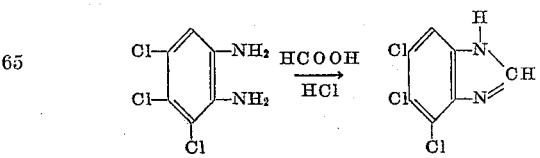

A mixture of 11.9 grams (0.056 mole) of 1,2,3-trichloro-4,5-diaminobenzene, 7.74 g. (0.168 mole) of 98–100% formic acid in 480 ml. of 4 N hydrochloric acid was refluxed with good stirring for two and one-quarter hours. The mixture was then cooled and made just basic with concentrated ammonium hydroxide. The colored solid which appeared was collected and washed with water. Dried in vacuo over potassium hydroxide, it weighed 12.96 g., M. P. 230°, with softening at 200° C. It was then dissolved on the steam bath in a mixture of 35 ml. 2.5 N hydrochloric acid and 500 ml. of water, treated with activated charcoal and filtered. This charcoaling procedure was repeated three times until the filtrate was colorless. The filtrate was cooled and made just basic with 6 N ammonium hydroxide. The near colorless precipitate was refrigerated for three hours and was then collected and washed with water. Dried in vacuo over potassium hydroxide it weighed 8.56 g., M. P. 215–217° C. (softening at 200° C.). This was dissolved in 225 ml. of hot 50% ethanol, treated with activated charcoal and filtered by gravity with 2 x 15-ml. hot solvent mixture rinses, allowed to crystallize at room temperature and then placed in a refrigerator overnight. The nearly colorless crystals were collected and washed with cold 50% ethanol. Dried in vacuo over potassium hydroxide, the nearly colorless 4,5,6-trichlorobenzimidazole weighed 6.95 g., M. P. 226–228° C.

In a similar manner other halogen atoms can be substituted for 1,2,3-trichloro-4,5-diaminobenzene as the starting material in the above procedure. For example, 1,2,3-tribromo-4,5-diaminobenzene, 1,2-dichloro-3-bromo-4,5-diaminobenzene, 1,2-dibromo-3-chloro-4,5-diaminobenzene, 1,3-dichloro-2-bromo-4,5-diaminobenzene, 1,2,3-tri-iodo-4,5-diaminobenzene or 1,2-dichloro-3-iodo-4,5-diaminobenzene may be reacted with formic acid and a mineral acid to form the corresponding 4,5,6-tribromobenzimidazole, 5,6-dichloro-4-bromo-benzimidazole, 5,6-dibromo-4-chlorobenzimidazole, 4,6-dichloro-5-bromobenzimidazole, 4,5,6-triiodobenzimidazole, or 5,6-dichloro-4-iodobenzimidazole.

1-CHLOROMERCURI-4,5,6-(5,6,7)-TRICHLOROBEN-
ZIMIDAZOLE

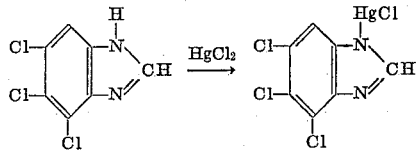

Five and fifty-three hundredths grams (0.025 mole) of 4,5,6-trichlorobenzimidazole was dissolved in 250 ml. of hot 50% ethanol. To this mixture was added 25 ml. of 1 N sodium hydroxide. A hot solution of 6.88 g. (0.025 mole) of mercuric chloride in 50 ml. of 50% ethanol was added with stirring. A gelatinous precipitate formed immediately. The mixture was stirred and heated on the steam bath until the precipitate became grainy. It was collected on a funnel and washed with water. The cake was pressed as dry as possible on the funnel. The 1-chloromercuri-4,5,6-(5,6,7)-trichlorobenzimidazole dried in vacuo over potassium hydroxide weighed 10.89 g.

In a similar manner other halogenated benzimidazoles can be substituted for 4,5,6-trichlorobenzimidazole in the above procedure. For example, 4,5,6-tribromobenzimidazole, 4,5-dichloro-6-bromobenzimidazole, 4,5-dibromo-6-chlorobenzimidazole, 4,6-dichloro-5-bromobenzimidazole, 4,5,6-triiodobenzimidazole and 4,5-dichloro-6-iodobenzimidazole may be reacted with a mercuric halide to form the corresponding 1-halomercuri-4,5,6-(5,6,7)-tribromobenzimidazole, 1-halomercuri-4,5-dichloro-6 - bromo-(6,7-dichloro-5-bromo)-benzimidazole, 1-halomercuri-4,5-dibromo-6-chloro-(6,7-dibromo-5-dichloro)-benzimidazole, 1-halomercuri-4,6-dichloro-5-bromo- (5,7 - dichloro-6-bromo)-benzimidazole, 1-halomercuri-4,5,6-(5,6,7)-tri-iodobenzimidazole or 1-halomercuri-4,5-dichloro-6-iodo-(6,7-dichloro-5-iodo)-benzimidazole.

Mercuri bromide may be substituted for mercuric chloride to form the 1-bromomercuri-4,5,6-(5,6,7)-trihalobenzimidazole in the above reaction.

PREPARATION OF 4,5,6-(5,6,7)-TRICHLORO-1-(TRI-
ACETYL-D-RIBOFURANOSYL)-BENZIMIDAZOLE

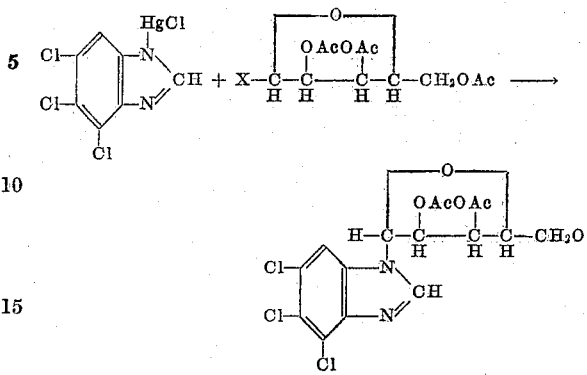

1-chloro-2,3,5-triacetyl-D-ribofuranose was prepared by suspending 9.55 grams (0.03 mole) of tetraacetyl-D-ribofuranose, M. P. 84–85° C. in about 300 ml. of dry ether (dried over sodium) and saturated at 0° C. with anhydrous hydrogen chloride. The solution was protected from moisture and stored in the cold room for three days. The solution was then evaporated in vacuo under anhydrous conditions at about 35° C. The syrup was reconcentrated three times adding about 90 ml. of dry benzene each time. This was done to remove residual hydrogen chloride. The 1-chloro-2,3,5-triacetyl-D-ribofuranose thus obtained was dissolved in about 40 ml. of dry xylene and used at once in the following reaction.

Thirteen and sixty-eight hundredths grams (0.03 mole) of 1 - chloromercuri-4,5,6-(5,6,7)-trichlorobenzimidazole was suspended in 1200 ml. of dry xylene in a 2-liter, 3-necked flask fitted with a stirrer, a condenser and a dropping funnel. About 100 ml. of xylene was distilled to remove any moisture. The 1-chloro-2,3,5-triacetyl-D-ribofuranose in about 40 ml. of dry xylene was added to the hot suspension in a steady stream. The mixture was refluxed gently with stirring for four hours. It was cooled to room temperature and then refrigerated. The solid material was collected, washed with xylene and petroleum ether. About 3 liters of petroleum ether was added to the filtrate. The precipitate that separated was collected and washed with petroleum ether. The combined solids were extracted portionwise with about 700 ml. of warm chloroform. The combined chloroform solutions were filtered and washed with two 150 ml. portions of 30% potassium iodide solution and twice with water. The chloroform solution was dried over anhydrous magnesium sulfate and concentrated under reduced pressure to leave 7.0 g. of a lightly colored glass, crude 4,5,6-(5,6, 7)-trichloro-1-(triacetyl-D-ribofuranosyl)-benzimidazole.

In a manner similarly described in the above reaction, 1 - bromo-2,3,5-triacetyl-D-ribofuranose, 1-chloro-2,3,5-tripropionyl - D-ribofuranose, 1-chloro-2,3,5-tributyryl-D-ribofuranose, 1-bromo-2,3,5-tribenzoyl-D-ribofuranose or 1-chloro-2,3,5-tribenzoyl-D-ribofuranose may be substituted for 1-chloro-2,3,5-triacetyl-D-ribofuranose to form 4,5,6 - (5,6,7) - trihalo-1-(triacyl-D-ribofuranosyl)-benzimidazoles, such as 4,5,6-(5,6,7)-tribromo-1-(triacetyl-D-ribofuranosyl) - benzimidazole, 4,5,6-(5,6,7)-tribromo-1-(tripropionyl - D - ribofuranosyl)-benzimidazole, 4,5,6-(5,6,7) - trichloro - 1 - (tributyryl-D-ribofuranosyl)-benzimidazole and 4,5,6-(5,6,7)-tribromo-1-(tribenzoyl-D-ribofuranosyl)-benzimidazole.

Other halogenated compounds may also be employed in place of the 1-chloromercuri-4,5,6-(5,6,7)-trichlorobenzimidazole. For example, compounds such as 1-bromomercuri-4,5,6-(5,6,7)-tribromobenzimidazole, 1-chloromercuri - 4,5-dichloro-6-bromo-(6,7-dichloro-5-bromo)-benzimidazole, 1 - chloromercuri-4,5-dibromo-6-chloro-(6,7 - dibromo-5-chloro)-benzimidazole, 1-chloromercuri-4,6-dichloro-5-bromo-(5,7-dichloro-6-bromo) - benzimidazole, 1 - chloromercuri-4,5,6-(5,6,7)-tri-iodo-benzimidazole, 1-chloromercuri-4,5-dichloro-6-iodo-(6,7-dichloro-5-iodo)-benzimidazole may be reacted with 1-halo-2,3,5-triacyl-D-ribofuranose to form 4,5,6-(5,6,7)-tribromo-1-(triacyl - D - ribofuranosyl)-benzimidazole, 4,5-dichloro-6-bromo - (6,7-dichloro-5-bromo)-1-(triacyl-D-ribofuranosyl)-benzimidazole, 4,5-dibromo-6-chloro-(6,7-dibromo-5-chloro) - 1-(triacyl-D-ribofuranosyl)-benzimidazole, 4,6-dichloro - 5-bromo-(5,7-dichloro-6-bromo)-1-(triacyl-D-ribofuranosyl) - benzimidazole, 4,5,6-(5,6,7)-tri-iodo-1-(triacyl - D-ribofuranosyl)-benzimidazole, and 4,5-dichloro - 6 - iodo-(6,7-dichloro-5-iodo)-1-(triacyl-D-ribofuranosyl)-benzimidazole.

PREPARATION OF 4,5,6-(5,6,7)-TRICHLORO-1-D-RIBOFURANOSYLBENZIMIDAZOLE

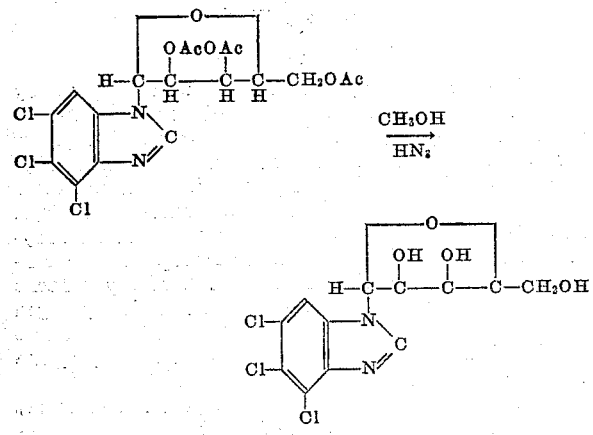

Methanol (250 ml.) was saturated with anhydrous ammonia at 0° C. (about 70 g. required). To this solution was added 7.0 g. of 4,5,6-(5,6,7)-trichloro-1-(triacetyl-D-ribofuranosyl)-benzimidazole in 100 ml. of methanol. The solution was placed in the cold room for about 16 hours. It was then concentrated under reduced pressure giving an almost completely crystalline solid. This was dissolved in 110 ml. of hot 50% ethanol, treated with activated charcoal and filtered by gravity with two 5 ml. solvent rinses. It was cooled to room temperature, seeded and allowed to crystallize at room temperature with frequent stirring and then refrigerated overnight. The crystals were collected and washed with a small quantity of cold 50% ethanol. After drying in vacuo over potassium hydroxide the product weighed 2.25 g., M. P. 215–217° C. (softening at 210° C.). This product was dissolved in 70 ml. of hot 50% ethanol, treated with activated charcoal and filtered by gravity with two 2.5 ml. solvent rinses. It was allowed to crystallize at room temperature and then refrigerated. The colorless crystals were collected, washed with cold 50% ethanol and dried in vacuo over potassium hydroxide. The product, 4,5,6-(5,6,7)-trichloro-1-D - ribofuranosylbenzimidazole, weighed 1.82 g., M. P. 230–232° C.

An analytical sample was prepared as follows: One gram was dissolved in 100 ml. of methanol and filtered by gravity with a 10 ml. methanol rinse. Then 850 ml. of isopropyl ether (dried over anhydrous magnesium sulfate) was added. Precipitation was very slow at room temperature, but increased somewhat when the solution was seeded and scratched. After overnight refrigeration, the colorless precipitate was collected and washed with methanol-isopropyl ether mixture (1:10 by volume) and then with petroleum ether (B. P. 30–60°). Dried in vacuo over potassium hydroxide, the 4,5,6-(5,6,7)-trichloro-1-D-ribofuranosylbenzimidazole weighed 0.51 g., M. P. 216–218° C. The sample was dried two hours at 100° C. in vacuo over phosphorous pentoxide.

*Analysis.*—Calculated for $C_{12}H_{11}O_4N_2Cl_3$: C, 40.76; H, 3.14; N, 7.92. Found: C, 41.00; H, 3.39; N, 8.42.

A second run starting with 20.52 g. (0.045 mole) of 1-chloromercuri-4,5,6-trichlorobenzimidazole and 14.33 g. (0.045 mole) of tetracetyl-D-ribofuranose gave 14.1 g. of 4,5,6-(5,6,7)-trichloro-1-(triacetyl - D - ribofuranosyl)-benzimidazole. Deacetylation followed by two crystallizations from 50% ethanol gave 3.85 g., M. P. 230–231° C., of 4,5,6-(5,6,7)-trichloro-1-D-ribofuranosylbenzimidazole.

*Analysis.*—Calculated for $C_{12}H_{11}O_4N_2Cl_3$: C, 40.76; H, 3.14; N, 7.92. Found: C, 40.79; H, 2.84; N, 8.19.

In like manner other 4,5,6-(5,6,7)-trihalo-1-(triacyl-D-ribofuranosyl)-benzimidazole compounds may be hydrolyzed. For example 4,5,6-(5,6,7)-tribromo-1-triacyl-D-ribofuranosyl)-benzimidazole, 4,5-dichloro-6-bromo-(6,7 - dichloro - 5 - bromo) - 1 - (triacyl - D - ribofuranosyl)-benzimidazole, 4,5-dibromo-6-chloro-(6,7-dibromo-5-chloro) - 1 - (triacyl - D - ribofuranosyl) - benzimidazole, 4,6 - dichloro - 5 - bromo - (5,7 - dichloro - 6 - bromo) - 1-(triacyl-D-ribofuranosyl)-benzimidazole, 4,5,6(5,6,7)-tri-iodo-1-(triacyl-D-ribofuranosyl)-benzimidazole or 4,5-dichloro - 6 - iodo - (6,7 - dichloro - 5 - iodo) - 1 - (triacyl-D-ribofuranosyl)-benzimidazole may be hydrolyzed to form 4,5,6-(5,6,7)-tribromo-1-D-ribofuranosyl-benzimidazole, 4,5-dichloro-6-bromo-(6,7-dichloro-5-bromo)-1-D-ribofuranosylbenzimidazole, 4,5-dibromo-6-chloro-(6,7 - dibromo - 5 - chloro) - 1 - D - ribofuranosylbenzimidazole, 4,6 - dichloro - 5 - bromo - (5,7 - dichloro - 6 - bromo) - 1 - D - ribofuranosylbenzimidazole, 4,5,6 - (5,6,7) - tri - iodo - 1 - D - ribofuranosylbenzimidazole and 4,5-dichloro-6-iodo-(6,7-dichloro-5-iodo)-1-D-ribofuranosylbenzimidazole.

PREPARATION OF 4,5,6-(5,6,7)-TRICHLORO-1-D-RIBOFURANOSYLBENZIMIDAZOLE HYDROCHLORIDE 4,5,6 - (5,6,7) - trichloro - 1 - D - ribofuranosylbenzimidazole hydrochloride may be prepared by dissolving 4,5,6 - (5,6,7) - trichloro - 1 - D - ribofuranosylbenzimidazole in dry ethanol, saturating the solution with dry hydrogen chloride and adding ether to precipitate 4,5,6-(5,6,7)-trichloro-1-D-ribofuranosylbenzimidazole hydrochloride.

*Example 2*

PREPARATION OF 4,5,6-TRIBROMOBENZIMIDAZOLE

A mixture of 7 g. of crude 1,2,3-tribromo-4,5-diaminobenzene, 75 ml. of formic acid, 50 ml. of hydrochloric acid and 100 ml. of water was refluxed for five hours. The reaction mixture was diluted with water, heated to boiling and activated charcoal was added. After filtering and cooling, the solution was made alkaline with ammonium hydroxide, whereupon a precipitate formed. The precipitate was collected, washed with water and dried. The precipitate was recrystallized from 3 liters of benzene to yield 19 g. of 4,5,6-tribromobenzimidazole which had a melting point of 231–234° C.

*Analysis.*—Calculated for $C_7H_3N_2Br_3$: C, 23.69; H, 0.85; N, 7.90. Found: C, 23.62; H, 0.81; N, 8.15.

PREPARATION OF 1-CHLOROMERCURI-4,5,6-(5,6,7)-TRIBROMOBENZIMIDAZOLE

To a solution of 14.2 g. of 4,5,6-tribromobenzimidazole in 165 ml. of 50% ethanol was added 44 ml. of 1 N sodium hydroxide. While the solution was heated and stirred, a mixture of 10.9 g. of mercuric chloride in 130 ml. of hot ethanol was added. The gelatinous precipitate became grainy after about one hour of heating and stirring. The 1-chloromercuri-4,5,6-(5,6,7)-tribromobenzimidazole was collected, washed with water and dried.

PREPARATION OF 4,5,6-(5,6,7)-TRIBROMO-1-(TRIACETYL-D-RIBOFURANOSYL-BENZIMIDAZOLE 1-chloro-2,3,5-triacetyl-D-ribofuranose was prepared by dissolving 9.87 g. of tetraacetyl-D-ribofuranose which had been ground and dried over phosphoric anhydride, in 200 ml. of dry ether. The solution was saturated with anhydrous hydrogen chloride at 0° C. and stored at 4° C. for 4 days. The solution was concentrated under reduced pressure to a sirup. Three portions of dry benzene were added and evaporated under reduced pressure. The residue of 1-chloro-2,3,5-triacetyl-D-ribofuranose was dissolved in dry xylene and used immediately in the following reaction.

Nineteen grams of 1-chloromercuri-4,5,6-(5,6,7)-tribromobenzimidazole was suspended in 1100 ml. of dry xylene, and 100 ml. of the xylene was distilled to remove any water. The 1-chloro-2,3,5-triacetyl-D-ribofuranose in xylene was added and the mixture was stirred and refluxed for four hours. The mixture was cooled and 3 liters of petroleum ether was added. The precipitate was collected and washed with petroleum ether. The precipitate was extracted with four 100 ml. portions of hot chloroform. The chloroform extracts were combined and washed with two 150 ml. portions of 30% potassium iodide, then twice with water. The chloroform layer, after drying over anhydrous magnesium sulfate was concentrated under reduced pressure. Most of the residue 4,5,6 - (5,6,7) - tribromo - 1 - (triacetyl - D - ribofuranosyl)-benzimidazole crystallized from solution.

PREPARATION OF 4,5,6-(5,6,7)-TRIBROMO-1-D-RIBOFURANOSYLBENZIMIDAZOLE

The 4,5,6-(5,6,7)-tribromo-1-(triacetyl-D-ribofuranosyl)-benzimidazole thus obtained was dissolved in 800 ml. of methanol. The solution was saturated with ammonia at 0° C. and maintained at 4° C. for about sixteen hours. The methanol solution was concentrated under reduced pressure. The crystals that formed were collected and recrystallized from hot methanol to form 3.6 g. of 4,5,6-(5,6,7)-tribromo-1-D-ribofuranosylbenzimidazole having a melting point of 230–235° C. $[\alpha]_D^{20} -57°$ (C. 1.1, pyridine).

Analysis.—Calculated for $C_{12}H_{11}N_2O_4Br_3$: C, 29.59; H, 2.28; N, 5.75. Found: C, 30.10; H, 2.67; N, 5.97.

Example 3

PREPARATION OF 1-BROMO-2,6-DICHLORO-4-NITROBENZENE

Thirty one g. (0.15 mole) of a 2,6-dichloro-4-nitroaniline was practically all dissolved in 200 ml. of sulfuric acid (sp. gr. 1.84). The solution was stirred and cooled in an ice-salt bath to about 0° C. A solution of 10 grams of sodium nitrite in 100 ml. of sulfuric acid (sp. gr. 1.84) was added over a period of about 5 minutes. While the solution was stirred and maintained at 0° C. to —5° C., 200 ml. of 85% phosphoric acid was added over a period of 45 minutes. The stirring was continued at about 5° C. for another 1.5 hours.

Cuprous bromide, prepared from 63 g. of cupric sulfate, 28.5 g. of sodium bromide and 16 g. of sodium sulfite was dissolved in 200 ml. of hydrobromic acid (sp. gr. 1.49). This solution was stirred vigorously while the diazonium solution was added under the surface as rapidly as the foaming due to the evolution of nitrogen would permit. The dark mixture which resulted was heated on a steam bath for 40 minutes. After cooling, it was poured over ice. The yellow solid 1-bromo-2,6-dichloro-4-nitrobenzene separated and was collected and washed with water.

The yellow solid was dissolved in hot benzene, the solution was dried over anhydrous magnesium sulfate, filtered and concentrated to dryness. The residue was dissolved in hot ethanol. On cooling, light yellow crystals separated. After recrystallization from ethanol the melting point of the 1-bromo-2,6-dichloro-4-nitrobenzene was 88°–90° C.

PREPARATION OF 1-BROMO-2,6-DICHLORO-4,5-DINTROBENZENE 17.3 g. (0.064 mole) of 1-bromo-2,6-dichloro-4-nitrobenzene was dissolved in 75 ml. of fuming nitric acid and 75 ml. of sulfuric acid (sp. gr. 1.84). Two layers formed. The mixture was heated on a steam bath for two hours with frequent shaking. After cooling, the reaction mixture was poured over ice. The yellow solid which formed was crystallized from 50% ethanol to yield 18.9 g. (94%) 1-bromo-2,6-dichloro-4,5-dinitrobenzene having a melting point of 126–130° C.

PREPARATION OF 1-BROMO-2,6-DICHLORO-4,5-DIAMINOBENZENE

To a suspension of 18.9 g. (0.06 mole) of 1-bromo-2,6-dichloro-4,5-dinitrobenzene in 100 ml. of hydrochloric acid (sp. gr. 1.19) was added 24 g. of mossy tin in pieces as the mixture was heated on a steam bath and frequently shaken. After the reaction was completed, water was added to the mixture to make about 1 liter and the mixture was boiled to dissolve the product. Activated charcoal was added to the reaction mixture and the mixture was filtered. The filtrate was made strongly alkaline with sodium hydroxide. The precipitate 1-bromo-2,6-dichloro-4,5-diaminobenzene which formed was collected and dried. The solid material was extracted with ether. The ether extract was concentrated to dryness to yield 14.3 g. (93%) of crude 1-bromo-2,6-dichloro-4,5-diaminobenzene.

PREPARATION OF 5(6)-BROMO-4,6-(5,7)-DICHLOROBENZIMIDAZOLE

To 14.3 g. of 1-bromo-2,6-dichloro-4,5-diaminobenzene was added 75 ml. of formic acid and 240 ml. of 4 N hydrochloric acid. The mixture was refluxed for 3 hours and boiling water was added to the mixture until the product dissolved. Activated charcoal was added to the solution and the mixture filtered. The 5-bromo-4,6-dichlorobenzimidazole hydrochloride crystallized when the solution was cooled. The cooled mixture was made alkaline with ammonium hydroxide. The precipitate was collected, washed with water and dried. After two recrystallizations from benzene, 9 g. (61%) of 5(6)-bromo - 4,6(5,7) - dichlorobenzimidazole, melting point 224–226° C., was obtained.

Analysis.—Calculated for $C_7H_2BrCl_2N_2$: C, 31.61; H, 1.14. Found: C, 31.88; H, 1.18.

PREPARATION OF 1-CHLOROMERCURI-5(6)-BROMO-4,6-(5,7)-DICHLOROBENZIMIDAZOLE

Nine grams of 5(6)-bromo-4,6(5,7)-dichlorobenzimidazole was dissolved in 150 ml. of hot 50% ethanol and 35 ml. of 1 N sodium hydoxide was added. While the solution was stirred and heated on a steam bath, 9.2 g. of mercuric chloride dissolved in 100 ml. of hot ethanol was added. After 40 minutes of heating and stirring, the precipitate, 1-chloromercuri-5(6)-bromo-4,6(5,7)-dichlorobenzimidazole, became granular. It was collected and washed with hot water, and weighed 16.6 g. (98%).

PREPARATION OF 5(6)-BROMO-4,6-(5,7)-DICHLORO-1-(TRIACETYL-D-RIBOFURANOSYL)-BENZIMIDAZOLE

A suspension of 16.6 g. of 1-chloromercuri-5(6)-bromo-4,6-(5,7)-dichlorobenzimidazole in 1100 ml. of dry xylene was prepared. About 100 ml. of xylene was distilled off to remove any water in the mixture. 1-chloro-2,3,5-triacetyl-D-ribofuranose, prepared by suspending 9.87 g. of 1,2,3,5-tetraacetyl-D-ribofuranose in 50 ml. of dry xylene was added to the hot suspension. The mixture was refluxed with stirring for 4 hours. After cooling, 3 liters of petroleum ether was added and the precipitate was collected and washed with petroleum ether. After drying, the precipitate was extracted with four 100 ml. portions of hot chloroform. The chloroform extracts were washed with two 150 ml. portions of 30% potassium iodide followed by two portions of water. After drying over anhydrous magnesium sulfate, the chloroform solution was concentrated to a yellow oil containing crude 5(6)-bromo - 4,6 - (5,7) - dichloro - 1 - (triacetyl - D - ribofuranosyl)-benzimidazole.

PREPARATION OF 5(6)-BROMO-4,6-(5,7)-DICHLORO-1-(β-D-RIBOFURANOSYL)-BENZIMIDAZOLE AND 5(6)-BROMO-4,6-(5,7)-DICHLORO-1-(α-D-RIBOFURANOSYL)-BENZIMIDAZOLE

The crude 5(6)-bromo-4,6-(5,7)-dichloro-1-(triacetyl-D-ribofuranosyl)-benzimidazole in 120 ml. of methanol was added to 250 ml. of methanol which had been saturated with ammonia at 0° C. The solution was stored at 4° C. overnight. The resulting solution was concentrated to an oil which was dissolved in about 130 ml. of hot 50% ethanol. After cooling, 1.62 g. of crystals of 5(6) - bromo - 4,6 - (5,7) - dichloro - 1 - (β-D-ribofuranosyl) - benzimidazole were collected and washed with 50% ethanol, melting point 203°–217° C. The filtrate was concentrated until crystals began to form. This crop of crystals had a melting point of 171–204° C.

The first crop was recrystallized several times from methanol to give 5(6)-bromo-4,6(5,7)-dichloro-1-(β-D-ribofuranosyl)-benzimidazole, melting point 217°–219° C., $[\alpha]_D^{20} -61° \pm 2°$ (C. 1, pyridine).

*Analysis.*—Calculated for $C_{12}H_{11}BrCl_2N_2O_4$: C, 36.21; H, 2.79; N, 7.04. Found: C, 36.07; H, 3.03; N, 7.17.

When the second group was crystallized from methanol, two types of crystals formed: small granules that grew on the glass and clumps of prisms. Mechanical separation of the clumps of prisms followed by several recrystallizations from methanol resulted in a small amount of 5(6) - bromo - 4,6 - (5,7) - dichloro - 1 - (α - D - ribofuranosyl)-benzimidazole, melting point 193°–196° C., $[\alpha]_D^{20} +34° \pm 3°$ (C. 1, pyridine).

*Analysis.*—Found: C, 36.78; H, 3.28; N, 7.54.

Various changes and modifications may be made in carrying out the present invention without departing from the spirit and scope thereof. Insofar as these changes and modifications are within the purview of the annexed claims, they are to be considered as part of this invention.

We claim:
1. 1-halomercuri-4,5,6-(5,6,7)-trihalobenzimidazole.
2. 1 - chloromercuri - 4,5,6-(5,6,7) - trichlorobenzimidazole.
3. 1 - chloromercuri - 4,5,6-(5,6,7) - tribromobenzimidazole.
4. 1 - chloromercuri - 5(6) - bromo - 4,6 - (5,7) - dichlorobenzimidazole.
5. The process which comprises reacting a 4,5,6-trihalobenzimidazole with a mercuric halide to form a 1-halomercuri-4,5,6-trihalobenzimidazole.
6. The process which comprises reacting 4,5,6-trichlorobenzimidazole with mercuric chloride to form 1-chloromercuri-4,5,6-trichlorobenzimidazole.
7. The process which comprises reacting 4,5,6-tribromobenzimidazole with mercuric chloride to form 1-chloromercuri-4,5,6-tribromobenzimidazole.
8. The process which comprises reacting 5(6)-bromo-4,6-(5,7)-dichlorobenzimidazole with mercuric chloride to form 1-chloromercuri-5(6)-bromo-4,6-(5,7)-dichlorobenzimidazole.

References Cited in the file of this patent

UNITED STATES PATENTS

| | | |
|---|---|---|
| 2,336,664 | Zwilgmeyer | Dec. 14, 1943 |
| 2,739,149 | Van Lare | Mar. 20, 1956 |

FOREIGN PATENTS

| | | |
|---|---|---|
| 10,228 | Great Britain | of 1906 |

OTHER REFERENCES

Tamm: Science, vol. 120, pages 847–8 (1954).
Tamm: Chem. Abstracts 120, vol. 49, column 16066 (1955).
Beilstein: (Handbuch der Org. Chem., 4th ed.), vol. 23, pages 134–135 (1936).
Elderfield: "Heterocyclic Compounds," vol 5, pp. 274–284 (1957).